April 22, 1952  A. G. GALBOIS  2,594,148
VEHICLE COMPASS
Filed May 10, 1950
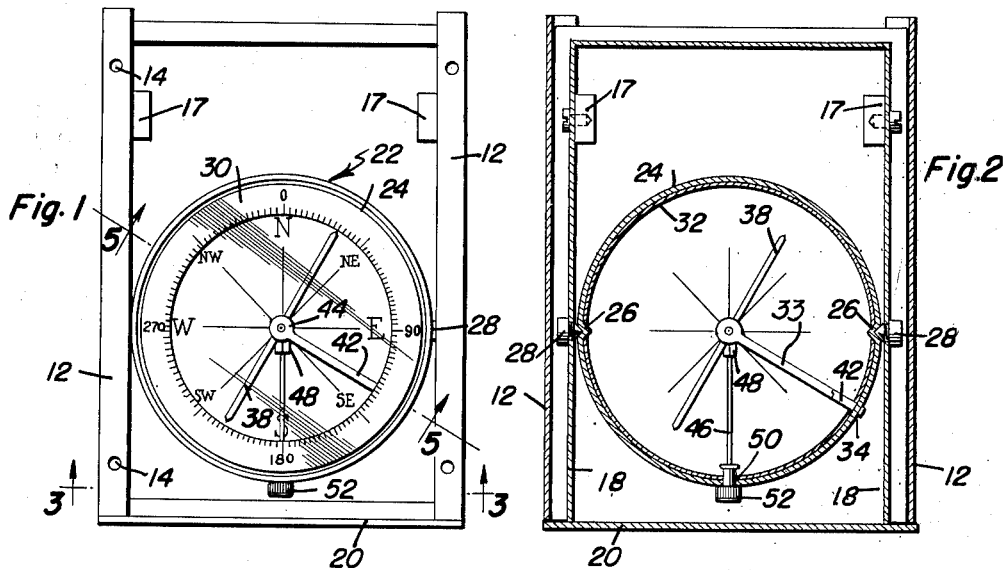
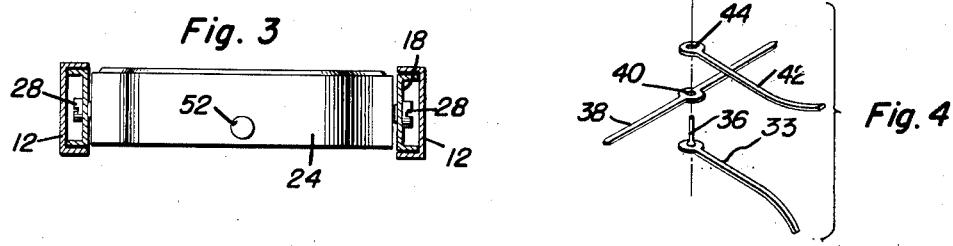
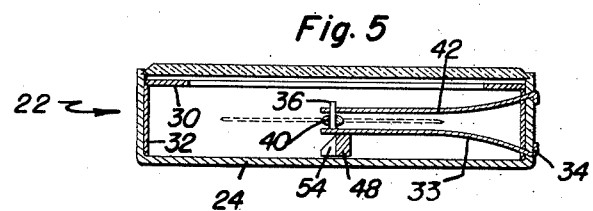
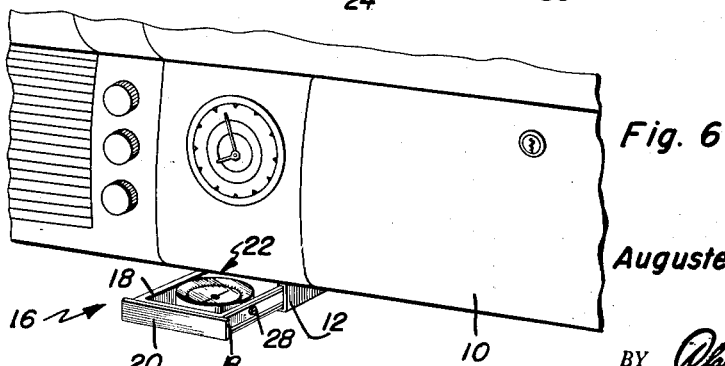
Auguste G. Galbois
INVENTOR.

Patented Apr. 22, 1952

2,594,148

UNITED STATES PATENT OFFICE 2,594,148

VEHICLE COMPASS

Auguste G. Galbois, Hollywood, Calif., assignor of fifty per cent to Mariette Belanger, Hollywood, Calif.

Application May 10, 1950, Serial No. 161,092

3 Claims. (Cl. 33—222)

This invention relates generally to compasses and more particularly to a compass assembly adapted for mounting on the instrument board of a motor vehicle.

A primary object of this invention is to provide a compass assembly in which the compass itself is of rugged and simple design to withstand the shocks transmitted thereto when the vehicle is in motion.

Another object of this invention is to provide a compass assembly which is adapted for mounting on a motor vehicle, the compass itself being easily removable from the assembly so that the same may be carried by a sportsman or another, when it is desired to use the compass at a distance from the vehicle.

Still another object of this invention is to provide a combination of a tray, compass and a cam adapted to shift the compass needle supporting members into needle clamping position, the tray front panel or wall comprising a guard for the manually operated cam to prevent the shifting of the cam inadvertently.

Yet another object of this invention is to provide a compass assembly which may be mounted on an instrument board of a vehicle so as to be completely hidden when not in use, while being easily shifted into a position to allow easy reference to the compass.

A last object of the invention specifically is to provide a device of the character mentioned above which is inexpensive and practicable to manufacture, simple to use, and which will give generally efficient and durable service.

With these objects definitely in view, the invention resides in certain novel features of construction, combination and arrangement of elements and portions as will be hereinafter described in detail in the specification, particularly pointed out in the appended claims and illustrated in the accompanying drawings which form a material part of this application and in which:

Figure 1 is a top plan view of the complete assembly;

Figure 2 is a horizontal sectional view of the assembly;

Figure 3 is a vertical transverse sectional view taken on the line 3—3 of Figure 1;

Figure 4 is an exploded view of the needle and needle support members;

Figure 5 is a vertical sectional view taken on the oblique section line 5—5 in Figure 1; and, Figure 6 is a view in perspective showing a portion of an instrument board with this invention operatively applied thereon.

Similar characters of reference indicate similar or identical elements and portions throughout the specification and throughout the several views of the drawings.

Referring now to the drawings in detail, this invention is adapted to be used with an environment including an instrument board 10, or analogous structure. A pair of opposing channel rails 12 are secured to the underside of the instrument board 10 by means of rivets 14 or the like, and the tray which is generally indicated by the numeral 16 is horizontally slidably mounted in said rails 12. Magnetic compensators 17 may be secured to the tray 16 as indicated in Figure 2, if necessary.

The tray 16 has vertical channel side walls 18 and a front wall 20, and the compass, generally indicated by the numeral 22, is removably mounted in this tray. The compass is of unique construction, and includes a casing 24 having opposed lateral depressions 26, into which set screws project, the set screws being threadedly mounted on the side walls 18 of the tray. The compass is thus made removable. The compass will also include a dial 30 which may have downwardly turned portions 32 to engage the inside of the casing 24 and to hold the dial in position.

A needle supporting member 33 comprises a resilient strap having one end inserted through apertures in the said portion 32 and the casing 24 and rigidly attached by any suitable means to the casing, as indicated at 34. This needle support member 33 carries an upright pin 36 which serves as an axis support member for the compass needle 38, which is provided with a hub portion 40 having suitable bearing structure to receive the axis pin 36. A second needle support member 42 is similarly secured to the casing 24 and has an apertured terminal 44 to receive the upper end portion of the upright pin 36. The second support member 42 is also resilient in the preferred form of this invention.

Due to the fact that this device is particularly designed for use in an automotive vehicle, special provision is made for locking the needle against vibration when not in use. This structure includes a cam having a spindle 46 extending horizontally within the case 24 and having a head of rectangular form positioned beneath the inner end of the first mentioned needle support member 33. The spindle 46 is journaled in the portion of the casing 24 adjacent the front wall 20 of the tray, as indicated at 50, and a manual control knob 52 is rigidly secured to the outer end of the spindle 46, so that the spindle may be rotated and the head 48 shifted from the position indicated in Figure 5 to a position in which the beveled laterally extending portion 54 of the head is shifted upwardly to force the inner end of the resilient needle support member 33 upwardly, carrying the hub portion 40 of the needle upwardly into engagement with the inner end of the second needle support member 42, thus locking or clamping the needle against vibration.

The operation of this invention will be clearly understood from a consideration of the foregoing description of the mechanical details thereof, taken in connection with the above recited objects and the drawing. In recapitulation, it may be added that when the operator is desirous of using the compass in the vehicle, the tray is pulled outwardly from the instrument board 10, into the position indicated in Figure 6. When it is not desired to use the compass, the tray is pushed inwardly. When the tray is thus pushed inwardly, it is desirable that the cam be turned by the manual control knob 52 so as to clamp the needle 38 against vibration. Alternatively, when the operator desires to leave the vehicle and to carry the compass with him, the set screws 28 are screwed outwardly and the compass unit is removed from the tray. It will be clear that all the objects mentioned above are amply achieved by this invention. Further description would appear unnecessary.

Having thus described the invention, what is claimed as new is:

1. A magnetic compass assembly comprising opposed rails securable to the underside of an automobile instrument board and disposed transversely thereof, a tray slidably mounted on said rails, a magnetic compass removably mounted on the tray, said tray being slidable into positions so that the compass is alternatively exposed and hidden beneath the instrument board, said compass having a resilient needle support member and a cam manually shiftable to move said support member into needle clamping position, a portion of said tray comprising a guard for said cam to prevent its being inadvertently shifted, said needle support including an upright axis pin, a second resilient needle support member having an aperture engaged by said pin and vertically spaced above the first mentioned needle support member to accommodate a needle on said pin, said needle support members clamping the needle between them when said cam is in one position.

2. A compass assembly comprising a tray and mounting means therefor, a magnetic compass having a case removably mounted in said tray, a resilient needle support member and a cam adjustably mounted on said case and manually shiftable to more said support member into needle clamping position, a portion of said tray comprising a guard for the cam to prevent its being inadvertently shifted, said needle support including an upright axis pin, a second resilient needle support member having an aperture engaged by said pin and vertically spaced above the first mentioned needle support member to accommodate a needle on said pin, said needle support members clamping the needle between them when said cam is in one position, and said needle support members being terminally secured to said case.

3. A compass assembly comprising a tray and mounting means therefor, a magnetic compass having a case removably mounted in said tray, a resilient needle support member and a cam adjustably mounted on said case and manually shiftable to move said support member into needle clamping position, a portion of said tray comprising a guard for the cam to prevent its being inadvertently shifted, said needle support including an upright axis pin, a second resilient needle support member having an aperture engaged by said pin and vertically spaced above the first mentioned needle support member to accommodate a needle on said pin, said needle support members clamping the needle between them when said cam is in one position, and said needle support members being terminally secured to said case, said case having opposed lateral depressions, said tray having side walls having set screws therein engaged in said depressions whereby said compass is detachably pivotally mounted between said side walls.

AUGUSTE G. GALBOIS.

REFERENCES CITED

The following references are of record in the file of this patent:

UNITED STATES PATENTS

| Number | Name | Date |
|---|---|---|
| 887,140 | Stedman | May 12, 1908 |
| 2,396,202 | Reitzer | Mar. 5, 1946 |
| 2,461,864 | Zuschlag | Feb. 15, 1949 |

FOREIGN PATENTS

| Number | Country | Date |
|---|---|---|
| 78,343 | Sweden | Sept. 12, 1933 |
| 220,782 | Switzerland | Oct. 16, 1942 |